US010259363B2

(12) United States Patent  
Torres

(10) Patent No.: US 10,259,363 B2  
(45) Date of Patent: Apr. 16, 2019

(54) BODY SUPPORT SYSTEM

(71) Applicant: Maria de Los Angeles Torres, Seattle, WA (US)

(72) Inventor: Maria de Los Angeles Torres, Seattle, WA (US)

(73) Assignee: Maria de Los Angeles Torres, Falls Church, VA (US)

( * ) Notice: Subject to any disclaimer, the term of this patent is extended or adjusted under 35 U.S.C. 154(b) by 146 days.

(21) Appl. No.: 15/278,391

(22) Filed: Sep. 28, 2016

(65) Prior Publication Data

US 2017/0158103 A1 Jun. 8, 2017

Related U.S. Application Data

(60) Provisional application No. 62/262,359, filed on Dec. 2, 2015.

(51) Int. Cl.
| | | |
|---|---|---|
| *B60N 2/60* | (2006.01) | |
| *B60N 2/44* | (2006.01) | |
| *B60N 2/48* | (2006.01) | |

(52) U.S. Cl.
CPC ............. *B60N 2/60* (2013.01); *B60N 2/4495* (2013.01); *B60N 2/4879* (2013.01); *B60N 2002/4405* (2013.01)

(58) Field of Classification Search
CPC . B60N 3/06; B60N 3/063; B60N 2/34; B60N 2/345; B60N 2/58; B60N 2/2851; B60N 2/4879; B60N 2/6009; B60N 2/6027; A47C 1/10; A47C 7/36; A47C 7/38; A47C 7/383; A61G 2220/14; A47G 9/08; A45F 3/00; A45F 3/22; A45F 3/02; A45F 4/00; A45F 4/06; A45F 4/08
USPC .................................................. 224/156; 5/94
See application file for complete search history.

(56) References Cited

U.S. PATENT DOCUMENTS

| | | | | |
|---|---|---|---|---|
| 400,131 | A * | 3/1889 | Small .......................... | A45F 3/22 297/232 |
| 2,038,335 | A * | 4/1936 | Aronow ................. | A47G 9/1045 5/419 |
| 2,688,998 | A * | 9/1954 | Erickson ............... | B60N 2/6009 297/219.1 |

(Continued)

FOREIGN PATENT DOCUMENTS

| | | | | |
|---|---|---|---|---|
| CN | 203234234 U | | 10/2013 | |
| GB | 191004913 A | * | 7/1910 | ............. A47G 9/066 |

(Continued)

*Primary Examiner* — Nicholas F Polito  
*Assistant Examiner* — Amanda L Bailey

(57) ABSTRACT

A body support system for supporting the body of a seated wearer is provided. The body support system may include an main body unit comprising a main panel and a hood portion and a suspension unit. The hood portion may be configured to cover a wearer's head and may include at least one hood stay for supporting the wearer's head by securing to a seat back of the wearer. The main panel may further include an upper body portion and a lower body portion configured to wrap around the wearer. The lower body portion may include lower stays configured to elevate the legs of the wearer through connection to suspension stays of the suspension unit. The suspension unit may be configured to be secured to a seat back in front of the wearer.

10 Claims, 9 Drawing Sheets

(56) References Cited

U.S. PATENT DOCUMENTS

| | | | |
|---|---|---|---|
| 3,580,633 A * | 5/1971 | Du Priest | A47C 3/16 297/17 |
| 5,884,331 A * | 3/1999 | Barajas | A41D 3/08 2/69 |
| 7,263,730 B2 | 9/2007 | Crawford | 5/413 R |
| 7,779,492 B2 | 8/2010 | Mangano | 5/482 |
| 7,802,844 B1 * | 9/2010 | Vencill | A47C 4/02 297/16.2 |
| 7,954,900 B2 | 6/2011 | Shantha et al. | 297/423.4 |
| 8,287,045 B1 * | 10/2012 | Donohue | B60N 2/2812 297/391 |
| 8,726,419 B2 | 5/2014 | Vahey | 2/173 |
| 2004/0216238 A1 | 11/2004 | Stewart | |
| 2010/0256716 A1 * | 10/2010 | Haislip | A41D 15/04 607/108 |
| 2011/0089725 A1 * | 4/2011 | Shantha | B60N 3/06 297/180.1 |
| 2012/0096626 A1 | 4/2012 | Edwards | |
| 2014/0159450 A1 | 6/2014 | Guering | 297/284.3 |
| 2015/0250240 A1 | 9/2015 | Hunkele | |
| 2015/0274044 A1 * | 10/2015 | Kreppein | A47G 9/1081 5/636 |

FOREIGN PATENT DOCUMENTS

| | | |
|---|---|---|
| WO | WO 2011/047417 | 4/2011 |
| WO | WO 2013/126393 | 8/2013 |

* cited by examiner

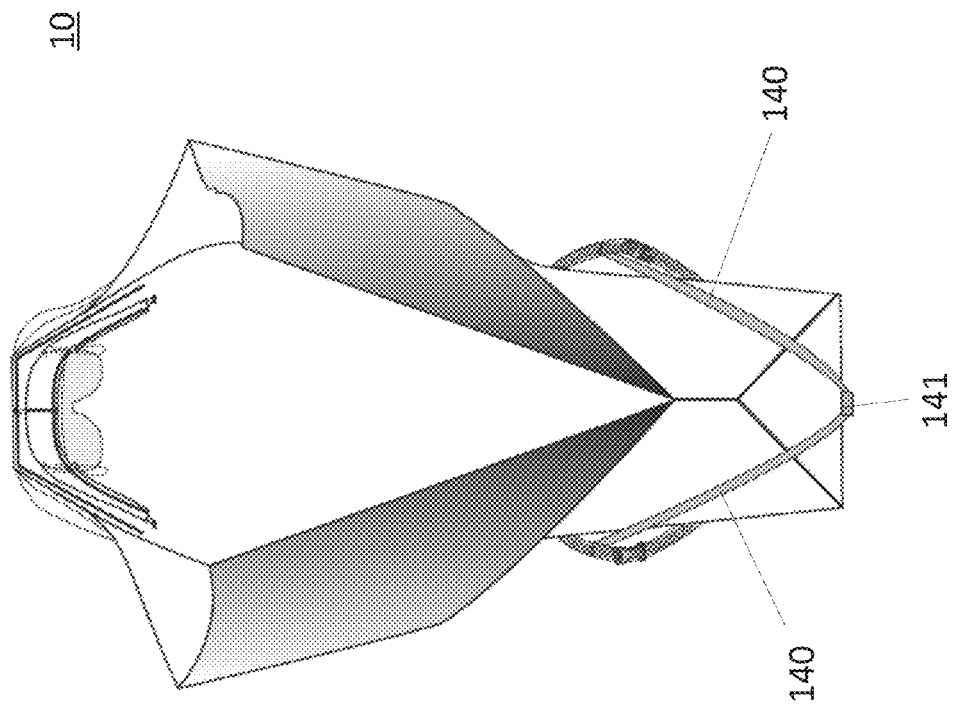

BODY SUPPORT SYSTEM

CROSS-REFERENCE TO RELATED APPLICATION

This application claims priority to U.S. Provisional Patent Application Ser. No. 62/262,359, filed Dec. 2, 2015, which is hereby incorporated by reference herein in its entirety.

FIELD OF THE INVENTION

The invention relates generally to a body support system, and more particularly to a body support system for supporting at least a user's head and legs while in a seated position such as, for example, in an airplane, train, bus, ferry, or other passenger vehicle seat.

BACKGROUND OF THE INVENTION

Sitting for extended periods of time can be quite uncomfortable, regardless of how ergonomically sound or comfortable a particular seat may be. Sleeping or even resting in a seat may prove difficult, particularly if the seat does not recline (or has limited recline). These problems may further be compounded when traveling, which often requires a traveler to remain seated in an upright (or nearly upright) position for long stretches of time. Further, temperature fluctuations in a passenger cabin may leave some passengers, such as those seated in near proximity to a door, colder than others.

In an effort to make travel more comfortable, airlines often make pillows and/or blankets available to passengers. These "extras" are often in short supply, however, and some airlines have even begun to charge passengers for their use. Moreover, uncertainty regarding the cleanliness of these pillows and blankets often causes passengers to avoid their use. Some passengers go so far as to carry their own pillows or blankets aboard. However, these items can be cumbersome to carry, and stricter airline regulations governing the number of carry-on items a passenger is allowed, along with the desire of many to travel "light," may make it difficult for a passenger to justify carrying such items on board.

Regardless of whether a traveler uses their own pillow or blanket, or ones provided by the airline, they often do little to help the comfort of the traveler. For example, during sleep, a pillow may slip or move out of position causing the passenger's head to tilt or fall out of a desired position. This may result in neck pain or discomfort, particularly if the passenger is asleep for a prolonged period of time. Air travel also increases the risk of deep-vein thrombosis ("DVT"), or the formation of a blood clot, often in the legs. Covering the legs with a blanket does little or nothing to address the concerns of DVT.

These and other challenges face individuals that sit for extended periods of time, particularly when traveling.

SUMMARY OF THE INVENTION

The invention addressing these and other drawbacks relates to a body support system for supporting at least a user's head and legs while in a seated position such as, for example, in an airplane, train, bus, ferry, or other passenger vehicle seat.

According to an aspect of the invention, the body support system may comprise a main body unit and a suspension unit. The main body unit may be configured to be releasably secured to a seat of a user. The main body unit may comprise a main panel and a hood portion. The hood portion may comprise a hood and one or more hood stays configured to secure the hood to the user's seat.

The suspension unit may be configured to be releasably secured to a second seat (or other structure) located forward of the user's seat. The suspension unit may include one or more attachment stays, one or more suspension stays, and a body portion. The one or more attachment stays may be configured to secure the suspension unit to the forward seat (or other structure).

In one implementation, the main body unit and the suspension unit are further configured to be releasably secured to one another, and the various components of the body support system are designed to fit within a pouch (or bag) of the suspension unit for convenient storage and transport.

When deployed, the body support system comprises a "cocoon-style" covering that provides warmth, support, and comfort to various portions of a wearer's body when the wearer is seated. For example, the main body unit may be configured to wrap around the body of a wearer, thereby functioning similarly to a blanket. A hood portion of the main body unit may be configured to provide support for a wearer's head. When worn, the hood portion may hold or otherwise maintain a wearer's head in an upright position without requiring any effort from the wearer. Thus, if a wearer falls asleep, he or she may not be awakened or otherwise disturbed by subsequent head movement caused by, for example, muscle relaxation.

Additionally, the suspension unit may be configured to elevate a wearer's legs for additional comfort. Raising a wearer's knees to a level above or similar to his or her hips may result in improved blood flow and improved relaxation. The body support system may include many additional features, as described below and with respect to the figures.

One advantage of the disclosed body support system is that it may be folded up and carried in its own convenient pouch that is compact and light-weight. The pouch is easy to secure to carry-on luggage (e.g., via one or more straps), and/or small enough to fit in carry-on luggage, which allows for quick removal and set-up when, for example, traveling. The body support system is useful for travel (e.g., on airplanes, trains, buses, ferries, or other passenger vehicles) as it facilitates sleeping or providing a general level of comfort that may not be otherwise obtainable with a standard seat. A user does not have to fight for (or even pay for) a pillow and/or blanket provided by the transportation provider, and does not have to worry about the sanitary condition of a provided pillow and/or blanket. The body support system may also be enjoyed in a home, office, or other environment.

Another advantage of the disclosed body support system is that it is designed to hold the user's head upright for stability, even when the user is sleeping. By retaining a user's head in a secure position via a hood, the user may avoid neck pain or discomfort associated with his or her head tilting forward or to the side during sleep for a prolonged period of time. The hood of the body support system includes adjustable straps (or stays) that allow a user to tighten or loosen the hood as desired. The hood also serves to keep the user's head warm.

Yet another advantage of the disclosed body support system is that it forms a "cocoon-like" structure when deployed that may help to keep the wearer's body warm. When traveling, a seat-belt may fastened over the "cocoon-like" structure such that the user does not have to be awakened or otherwise disturbed during a seat-belt check (e.g., during turbulence, etc.).

Still another advantage of the disclosed body support system is that the one or more hood stays configured to secure the hood to the user's seat (or seat back) are unobtrusive such that they will not disturb a passenger that may be seated behind the wearer (e.g., the hood stays will not obscure a seat-back screen of another passenger used to view movies and/or other programming).

Yet another advantage of the disclosed body support system is that the suspension unit enables the elevation of a wearer's legs to be quickly and easily adjusted, which can assist blood circulation through legs.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 7B is an exemplary illustration of a front view of a main body unit of a body support system in a folded configuration, according to an aspect of the invention.

DETAILED DESCRIPTION OF THE INVENTION

Figure 1:
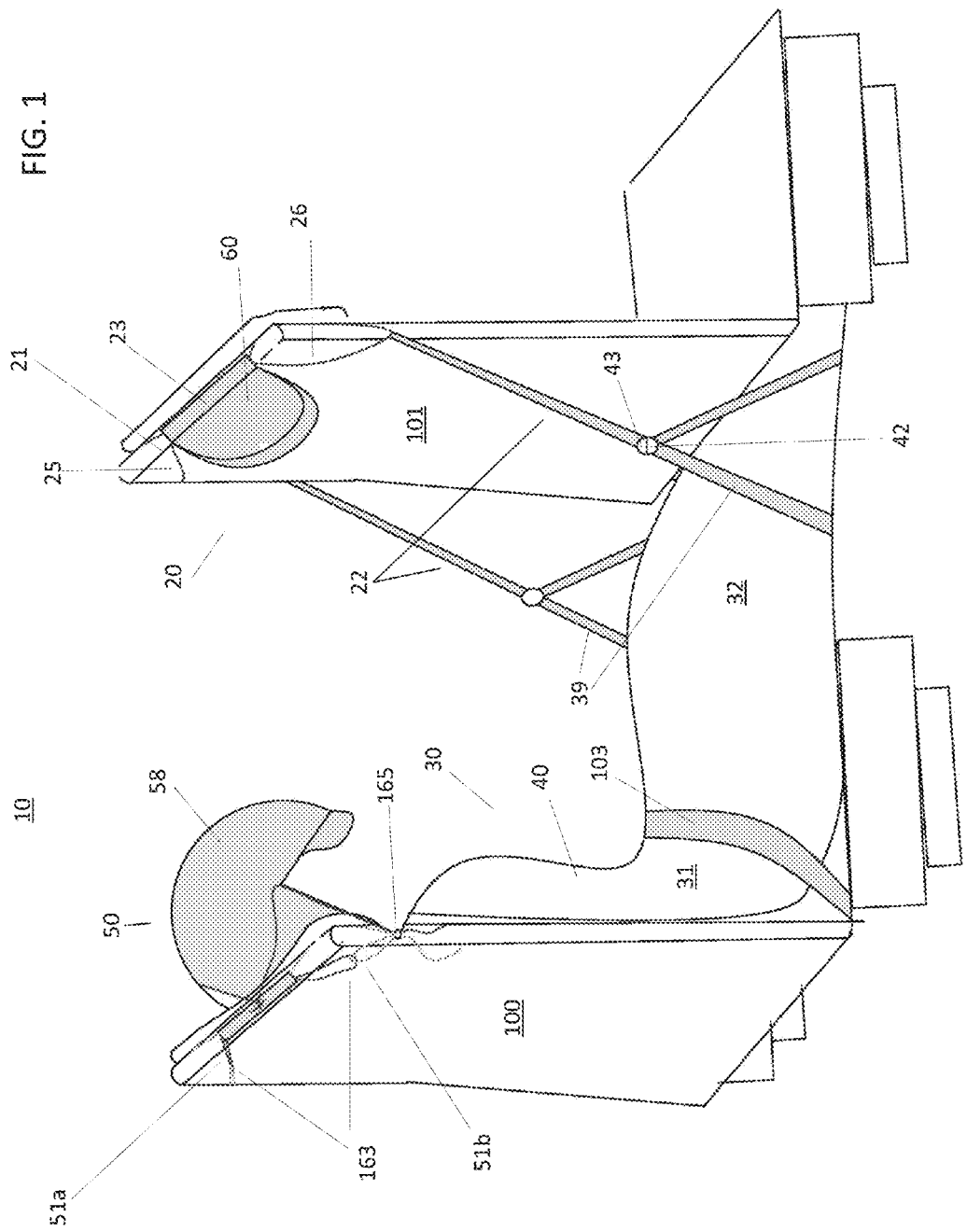
FIG. 1 is an exemplary illustration of a body support system for supporting at least a user's head and legs while in a seated position, according to an aspect of the invention.

FIG. 1 is an exemplary illustration of a body support system 10 for supporting at least a user's head and legs while in a seated position, according to an aspect of the invention.

Overview

In one implementation, body support system 10 may comprise a main body unit 30 and a suspension unit 20.

As described in greater detail herein, main body unit 30 may be configured to be releasably secured to a seat 100 of a user. Main body unit 30 may comprise a main panel 40 and a hood portion 50. Hood portion 50 may comprise a hood 58 and one or more hood stays (51a, 51b) configured to secure hood 58 to seat 100.

Suspension unit 20 may be configured to be releasably secured to a seat 101 (or other structure) located forward of the user's seat 100. Suspension unit 20 may include one or more attachment stays 21, one or more suspension stays 22, and a body portion 23. The one or more attachment stays 21 may be configured to secure suspension unit 20 to seat 101.

As used herein, a "stay" may comprise rope, string, line, cord, webbing, fabric strips, wire, metal strips, plastic strips, and/or any other material or structure configured for securing (whether releasably or permanently) one component to another structure or component.

In one implementation, main body unit 30 and suspension unit 20 are further configured to be releasably secured to one another as explained in greater detail below. The various components of body support system 10 are designed to fit within a pouch (or bag) 60 of suspension unit 20 for convenient storage and transport.

When deployed, body support system 10 comprises a "cocoon-style" covering that provides warmth, support, and comfort to various portions of a wearer's body when the wearer is seated. For example, main body unit 30 may be configured to wrap around the body of a wearer, thereby functioning similarly to a blanket. A hood portion 50 of main body unit 30 may be configured to provide support for a wearer's head. When worn, hood portion 50 may hold or otherwise maintain a wearer's head in an upright position without requiring any effort from the wearer. Thus, if a wearer falls asleep, he or she may not be awakened or otherwise disturbed by subsequent head movement caused by, for example, muscle relaxation.

Additionally, suspension unit 20 may be configured to elevate a wearer's legs for additional comfort. Raising a wearer's knees to a level above or similar to his or her hips may result in improved blood flow and improved relaxation. The body support system may include many additional features, as described below and with respect to the figures.

Although primarily described herein with reference to use on an airplane, it should be recognized that body support system 10 may be likewise used on a train, bus, ferry, or other passenger vehicle. Further, body support system 10 may also be used in a home, office, or other environment with any type of backed seat, chair, or bench, etc. For instance, seat 100 may comprise a backed chair in a home, and suspension unit 20 may be releasably secured to another chair 101 in the home, or to another structure that does not necessarily have to be a second seat. As such, any examples described herein are for explanatory purposes only, and should not be viewed as limiting. Further, the term "user" may be used interchangeably herein with "individual," "wearer," "passenger," "traveler," or with another similar descriptor.

The use of orientation-specific language herein (e.g., up/down, upper/lower, above/below, top/bottom, left/right, inward/outward, etc.) is for ease of explanation only, and should in no way be viewed as limiting. Such language may be used interchangeably with other descriptors including, but not limited to, first/second, etc.

Additionally, any descriptions herein of a "left" component or a "right" component of body support system 10, or a "left" side or a "right" side, are done so from the perspective of the wearer.

Main Body Unit 30

Figure 2:
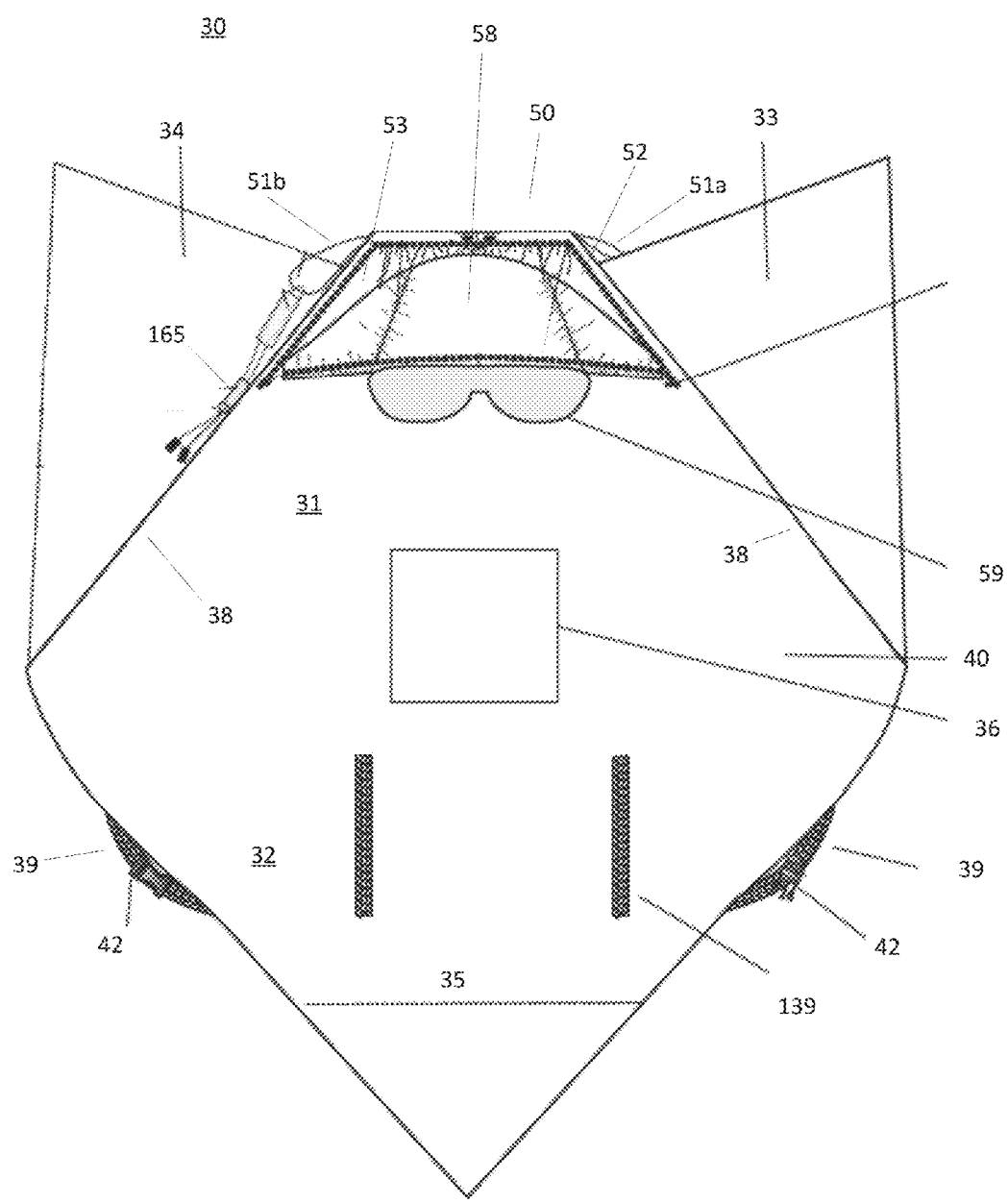
FIG. 2 is an exemplary illustration of a main body unit of a body support system in an unfolded state, according to an aspect of the invention.

FIG. 2 is an exemplary illustration of main body unit 30 of body support system 10 in an unfolded state, according to an aspect of the invention.

In one implementation, main panel 40 may comprise an upper portion 31, a lower portion 32, hood portion 50, a left front panel 33, and a right front panel 34. Upper portion 31 may also be referred to herein as a body portion, while lower portion 32 may also be referred to herein as a leg portion.

Upper portion 31 of main body unit 30 may be configured to wrap around an upper body of a wearer. Left front panel 33 and right front panel 34 may each be configured to wrap across a body of the wearer by folding the panels along folding portions 38.

Lower portion 32 may be configured to fold along folding portion 35 to wrap around a lower body of a wearer including, for example, the wearer's legs and/or to cover a wearer's feet. Lower portion 32 is illustrated in more detail in FIGS. 4A and 4B, which depict a folded configuration of main body unit 30. Lower stays 39 may be secured to lower portion 32 at support portions 139. Lower stays additionally may include lower stay securing mechanisms 42. The operation and construction of lower stays 39 may be understood in greater detail with respect to FIG. 5, discussed below.

In some implementations, folding portions 35, 38 may comprise a crease, seam, or other feature in the material of lower portion 32 to facilitate folding.

According to an aspect of the invention, upper portion 31, lower portion 32, left front panel 33, and right front panel 34 may be constructed of a single piece of material. Alternatively, in some implementations, upper portion 31, lower portion 32, left front panel 33, and right front panel 34 may be constructed of multiple pieces of material that are sewn, glued, fused, or otherwise joined together in any combination.

In one implementation, upper portion 31 of main body unit 30 may include a pocket 36 constructed with an opening to receive a support pillow (not illustrated). Pocket 36 may be positioned so as to enable support pillow to provide support for a lower back or lumbar region of a wearer during use. In some implementations, the support pillow may comprise an inflatable pillow.

In one implementation, in lieu of a pocket 36, support pillow may be permanently attached to upper portion 31 of main body unit 30 via, as a non-limiting example, stitching.

In yet another implementation, in lieu of a pocket 36, support pillow may be removably attached to upper portion 31 of main body unit 30 via one or more hook and loop fasteners, zippers, snaps, clips, buttons, ties, or via other known or hereafter developed attachment mechanisms.

Figure 3:
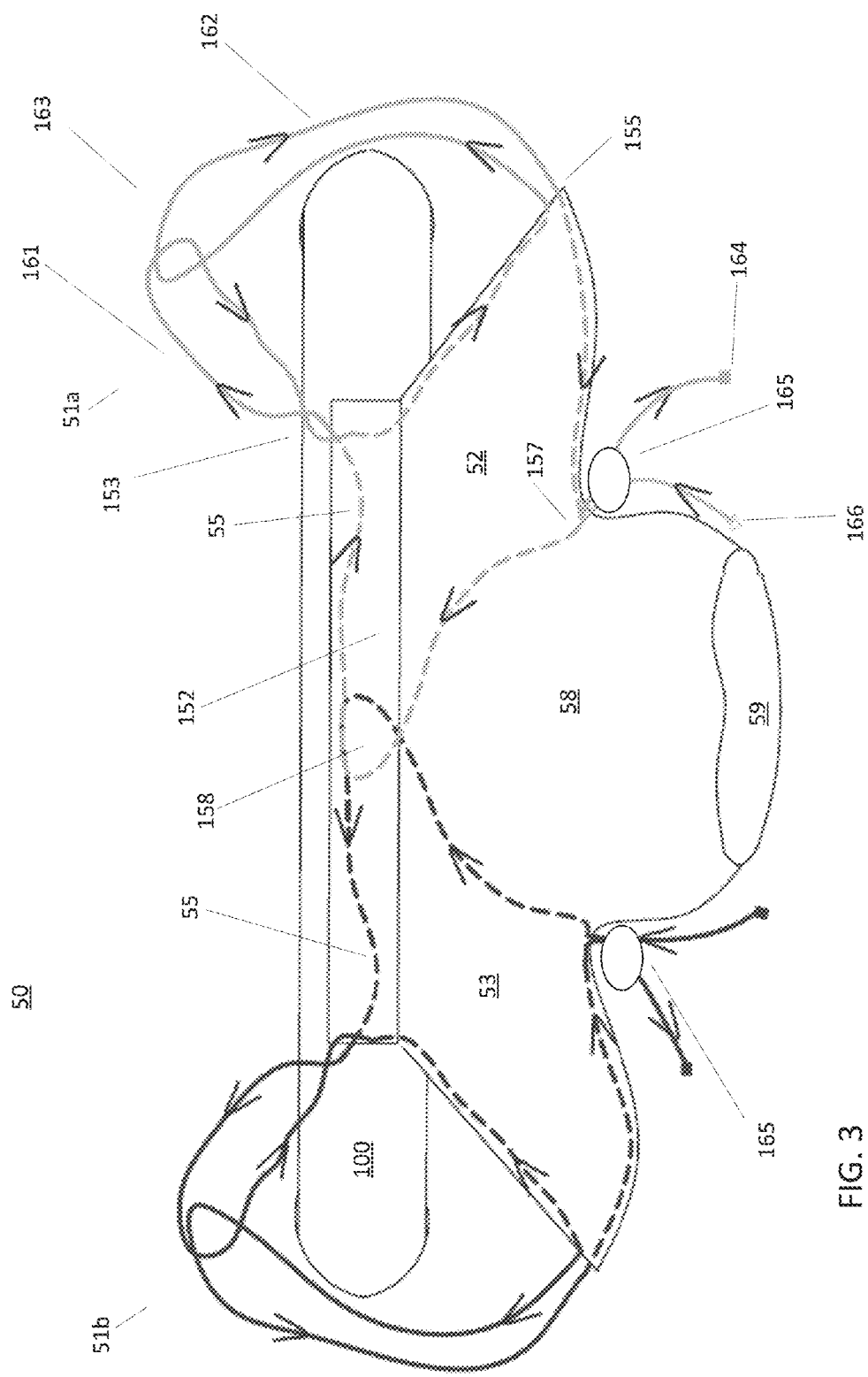
FIG. 3 is an exemplary illustration of a hood portion of a body support system, according to an aspect of the invention.

FIG. 3 is an exemplary illustration of hood portion 50 of body support system 10, according to an aspect of the invention. As previously noted, hood portion 50 of main body unit 30 may comprise hood 58 and one or more hood stays (51a, 51b) configured to secure hood 58 to seat 100. Hood portion 50 may further comprise a left hood panel 52, a right hood panel 53, and a rear hood panel 152. Hood portion 50 may be attached to and/or integral with main panel 40 of main body unit 30. Left hood panel 52 and right hood panel 53 may also be attached to and/or integral with hood 58, and may connect between the sides of hood 58 and main panel 40.

In one implementation, hood portion 50 may also include an eye mask 59. Eye mask 59 may be integral with or releasably attached to hood 58. As a non-limiting example, eye mask 59 may be releasably attached to hood 58 via one or more hook and loop fasteners, zippers, snaps, clips, buttons, ties, or via other known or hereafter developed attachment mechanisms.

In some implementations, eye mask 59 may be stuffed with batting. In an alternative implantation, eye mask 59 may include a single, double, or triple layer of material, and may or may not include stuffing.

Hood stays (51a, 51b) may be configured to provide secure positioning to hood 58 and a wearer's head when the body support system 10 is worn. Hood stays (51a, 51b) may be attached (e.g., sewn, glued, fused, etc.) directly to the material of hood 58, left hood panel 52, and/or right hood panel 53.

In some implementations, hood stays (51a, 51b) may be threaded through a fabric channel 56 in hood portion 50. Fabric channel 56 may be constructed, for example, by folding over and securing a fabric edge of hood portion 50 so as to form a channel. In some implementations, fabric channel 56 may be constructed by adding additional material to hood portion 50, and securing both (lengthwise) edges, leaving the center unsecured and hollow. In some implementations, fabric channel 56 may be secured to one or more of hood 58, left hood panel 52, and/or right hood panel 53.

Hood stays (51a, 51b) may include a left stay 51a and/or a right stay 51b configured to cooperate in securing hood 58 to support the head of a wearer. Left hood stay 51a may be configured to secure hood portion 50 to a left side of the seat back of the wearer (e.g., seat 100), and right hood stay 51b may be configured to secure hood portion 50 to a right side of the seat back of the wearer (e.g., seat 100).

Left hood stay 51a and right hood stay 51b may operate to secure hood 58 by providing opposing forces on hood 58. That is, when hood 58 is covering a user's head, force provided by left hood stay 51a may prevent a lean to the right while force provided by right hood stay 51b may prevent a lean to the left. Both hood stays (51a, 51b) may have portions secured to the back of hood 58 to prevent a wearer's head from leaning or slumping forward. Thus, when a wearer's head is enclosed in (or covered by) hood 58, hood stays (51a, 51b) may operate in a cooperative fashion to support the head and prevent significant movement of the head. A wearer can thus relax and rest or sleep without being awoken by unwanted head movements.

As depicted in FIG. 3, left hood stay 51a and right hood stay 51b follow mirror image patterns with respect to one another. For ease of explanation, an exemplary support pattern is described with respect to left hood stay 51a only, however right hood stay 51b may mirror the same pattern.

In one implementation, left hood stay 51a may be threaded through fabric channel 55 (indicated by dashed lines for hood stays 51a, 51b) starting at location 157. Left hood stay 51a may be threaded through fabric channel 55 to secure a left side of hood 58 at a border between left hood panel 52 and hood 58 and a rear side of hood 58 by running through a fabric channel 55 in rear panel 152.

Left hood stay 51a may exit fabric channel 55 at location 153 to form a first loop 161 for attaching to a seat back. Left hood stay 51a may reenter fabric channel 55 at location 153, run along a side edge of left hood panel 53, and exit fabric channel 55 at location 155 to form a second loop 162 loop for attaching to a seat back.

First loop 161 and second loop 162 may interlock to form a seat stay loop 163. Left hood stay 51a may reenter fabric channel 55 at location 155 to run along a front edge of left hood panel 52 and exit fabric channel 55 at location 157 where left hood stay 51a entered the fabric channels 55. Ends 166 and 164 of left hood stay 51a may be secured to one another by a cinching mechanism 165 (e.g., a spring-loaded clip, buckle, or other device). A user may secure seat stay loop 163 to a left edge of the seat back and pull left hood stay 51a ends 166 and 164 tight through cinching mechanism 165 to secure the left side of hood 58.

In the exemplary pattern illustrated in FIG. 3, left hood stay 51a provides support for a head in hood 58 at multiple locations and may reduce head movement forward and/or to the right while right hood stay 51b also supports hood 58 at multiple locations and may reduce head movement forward and/or to the left. In some implementations, left hood stay 51a and right hood stay 51b may interlock, for example, behind the head at location 158.

In some implementations, left hood stay 51a and right hood stay 51b may be configured to provide opposing tension forces in hood portion 50. In such an implementations, hood stays (51a, 51b) may each be configured to counteract the force provided by the other, with the head of the user (wearing hood 58) supported in the middle.

In alternative implementations, hood stays (51a, 51b) may be configured such that no force is provided unless the wearer of hood 58 moves his or her head.

Figure 4B:
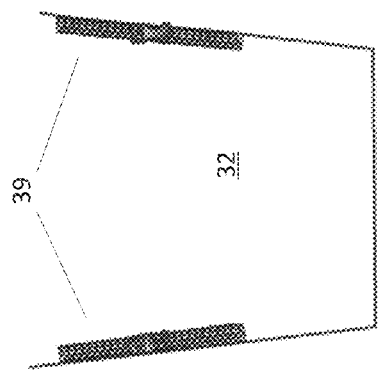
FIG. 4B is an exemplary illustration of a rear view of a lower portion of a main body unit of a body support system, according to an aspect of the invention.
Figure 4A:
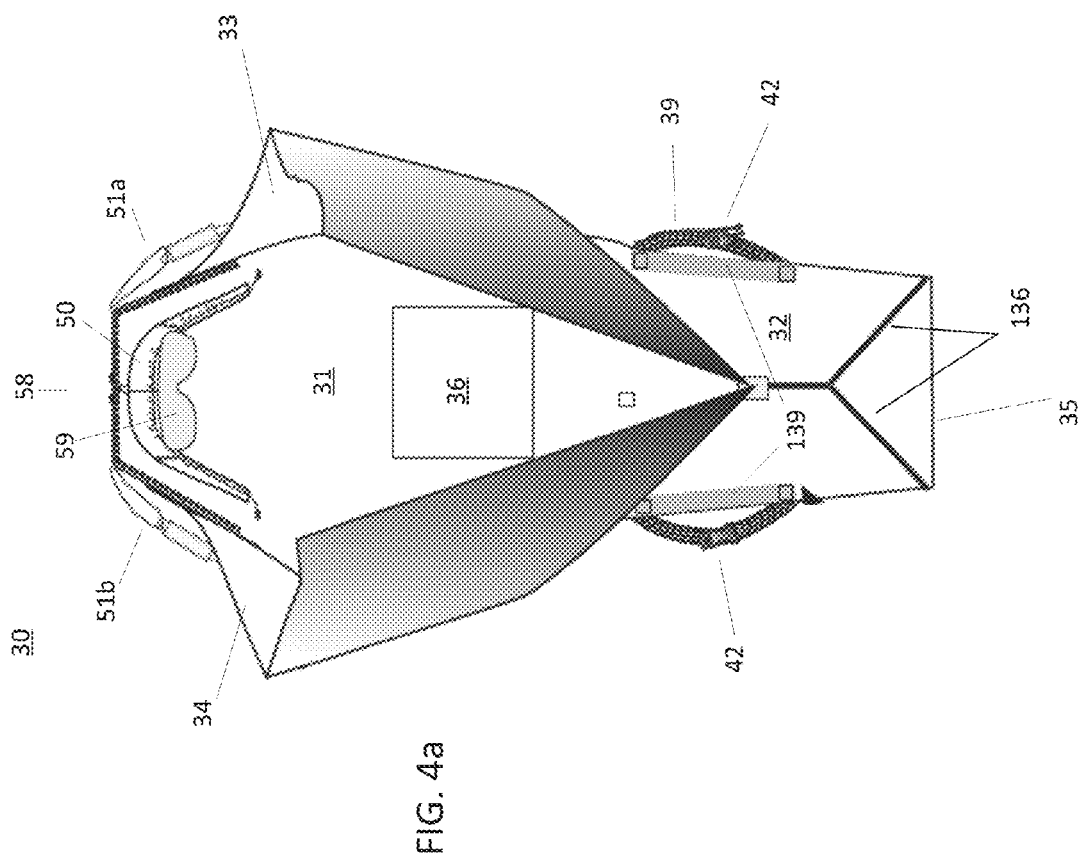
FIG. 4A is an exemplary illustration of a front view of a main body unit of a body support system in a folded configuration, according to an aspect of the invention.

FIG. 4A is an exemplary illustration of a front view of main body unit 30 in a folded configuration, according to an aspect of the invention. FIG. 4B is an exemplary illustration of a rear view of lower portion 32 of main body unit 30, according to an aspect of the invention.

As illustrated in FIG. 4A, edges 136 of lower portion 32 of main body unit 30 may be folded upward (or inward toward one another) to wrap around or cover a wearer's legs. In some implementations, edges 136 may be secured to one another via one or more hook and loop fasteners, zippers, snaps, clips, buttons, ties, or via other known or hereafter developed attachment mechanisms. In other implementations, edges 136 may not be secured to one another via one or more attachment mechanisms.

According to an aspect of the invention, lower portion 32 may include one or more lower stays 39. Lower stays 39 may be secured directly to lower portion 32 by, for example, stitching, adhesive, etc.

In some implementations, lower portion 32 may be reinforced, e.g., by thicker fabric, nylon webbing, etc., at support portions 139 where lower stays 39 are attached to lower portion 32.

In some implementations, lower stays 39 may be indirectly secured to lower portion 32, for example, by passing through reinforced openings (or channels) in lower portion 32. Lower stays 39 may include lower stay securing mechanisms 42 such as, for example, buckles, clips, ties, hook and loop fasteners, or via other known or hereafter developed securing mechanisms.

Lower stay securing mechanisms 42 may be secured to lower stays 39 adjustably, such that lower stay securing mechanisms 42 may be extended away from lower portion 32 on lower stays 39 or cinched closed to lower portion 32 on lower stays 39.

Lower stay securing mechanisms 42 may be configured for connection to corresponding suspension securing mechanisms 43 (illustrated in FIG. 5) of suspension unit 20, as discussed in greater detail below with respect to FIG. 5.

In some implementations, a single lower stay 39 may be provided. In such an implementation, the single lower stay 39 may be secured to lower portion 32 in a horizontal fashion, with a first end extending from one side of lower portion 32 and a second end extending from the other side of lower portion 32. Connection between a single lower stay 39 and lower portion 32 may be accomplished via any of the above discussed means with respect to a pair of lower stays 39.

According to an aspect of the invention, the various components of main body unit 30 (including, e.g., hood 58 and the various panels, etc.) may be constructed of any number of suitable materials. For example, main body unit 30 may be constructed of cotton, wool, linen, polyester, rayon, spandex, canvas, or other materials.

Materials may be selected depending on desired characteristics such as, for example, weight, thickness, warmth, breathability, stain resistance, comfort, moisture absorption and/or wicking, or any other desired characteristics, or combinations thereof.

In some implementations, various portions of main body unit 30 may be constructed of varying materials. For example, upper portion 31 and lower portion 32 may be constructed of a light-weight breathable material, for comfort, while left body panel 33 and right body panel 34 may be constructed of a heavier material, such as wool, to provide warmth. Other combinations may be implemented without limitation.

Suspension Unit 20

Figure 5:
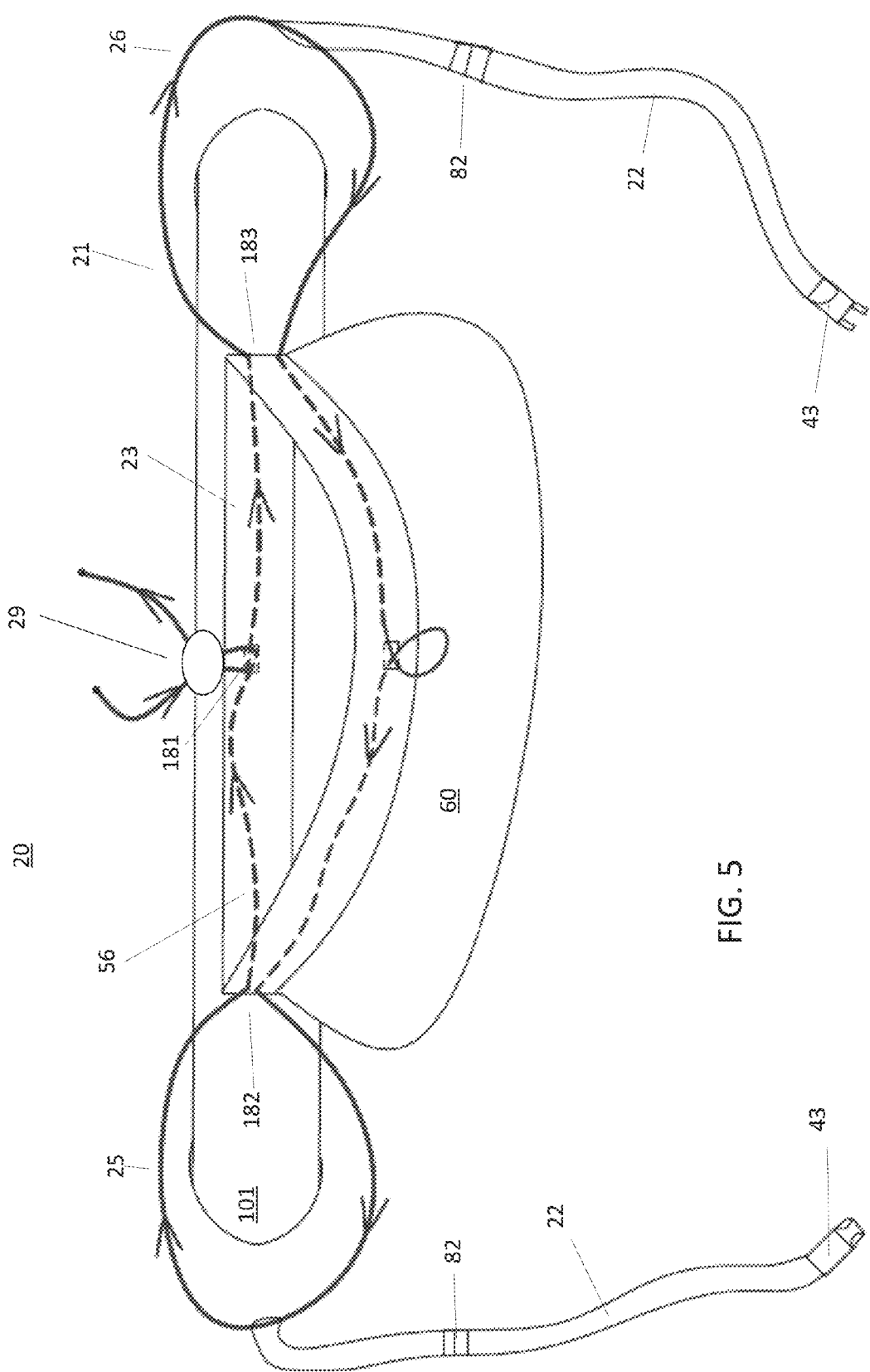
FIG. 5 is an exemplary illustration of a suspension unit, according to an aspect of the invention.

FIG. 5 is an exemplary illustration of suspension unit 20, according to an aspect of the invention. As previously described, suspension unit 20 may be configured to be releasably secured to a seat 101 (e.g., located forward of the user's seat), or to another structure. Suspension unit 20 may also be releasably secured to main body unit 30 via suspension securing mechanisms 43 which connect to corresponding lower stay securing mechanisms 42 of lower portion 32 of main body unit 30 (shown in FIG. 4A). This enables a wearer's legs to be elevated for additional comfort. Raising a wearer's knees to a level above or similar to his or her hips may result in improved blood flow and improved relaxation.

According to an aspect of the invention, suspension unit 20 may include one or more attachment stays 21, one or more suspension stays 22, and a body portion 23. Attachment stays 21 may be configured to secure suspension unit 20 to a back of seat 101 as noted above. Suspension stays 22 may be attached to or connected to attachment stays 21 (as illustrated in FIG. 5) and/or may be attached or connected to body portion 23. Suspension stays 22 may include a length adjustment mechanism 82 such as, for example, a webbing buckle or other mechanism.

In the exemplary support pattern of suspension unit 20 shown in FIG. 5, attachment stays 21 may be attached or secured directly or indirectly to body portion 23. In one implementation (as shown in FIG. 5), an attachment stay 21 may be indirectly secured to body portion 23 by one or more fabric channels 56.

Attachment stay 21 may enter a fabric channel 56 at location 181 and exit fabric channel 56 at location 183 to form right side loop 26. Attachment stay 21 may re-enter fabric channel 56 at location 183 and exit fabric channel 56 at location 182 to form left side loop 25. Attachment stay 21 may re-enter fabric channel 56 at location 182 and exit again at location 181. The ends of attachment stay 21 may be secured to one another by a clip, buckle, or other mechanism. The ends of attachment stay 21 may be configured to be cinched tight via cinching unit 29 to secure left side loop 25 and right side loop 26 to the seat back 101. When cinched tight via cinching unit 29, suspension unit may thus be (removably) secured to (the back of) seat 101. The illustrated support pattern of FIG. 5 is exemplary only. Other support patterns including multiple attachment stays 21 and attachment stays 21 constructed from webbing or other materials remain consistent with the present disclosure.

Storage Pouch (or Bag 60)

Figure 6:
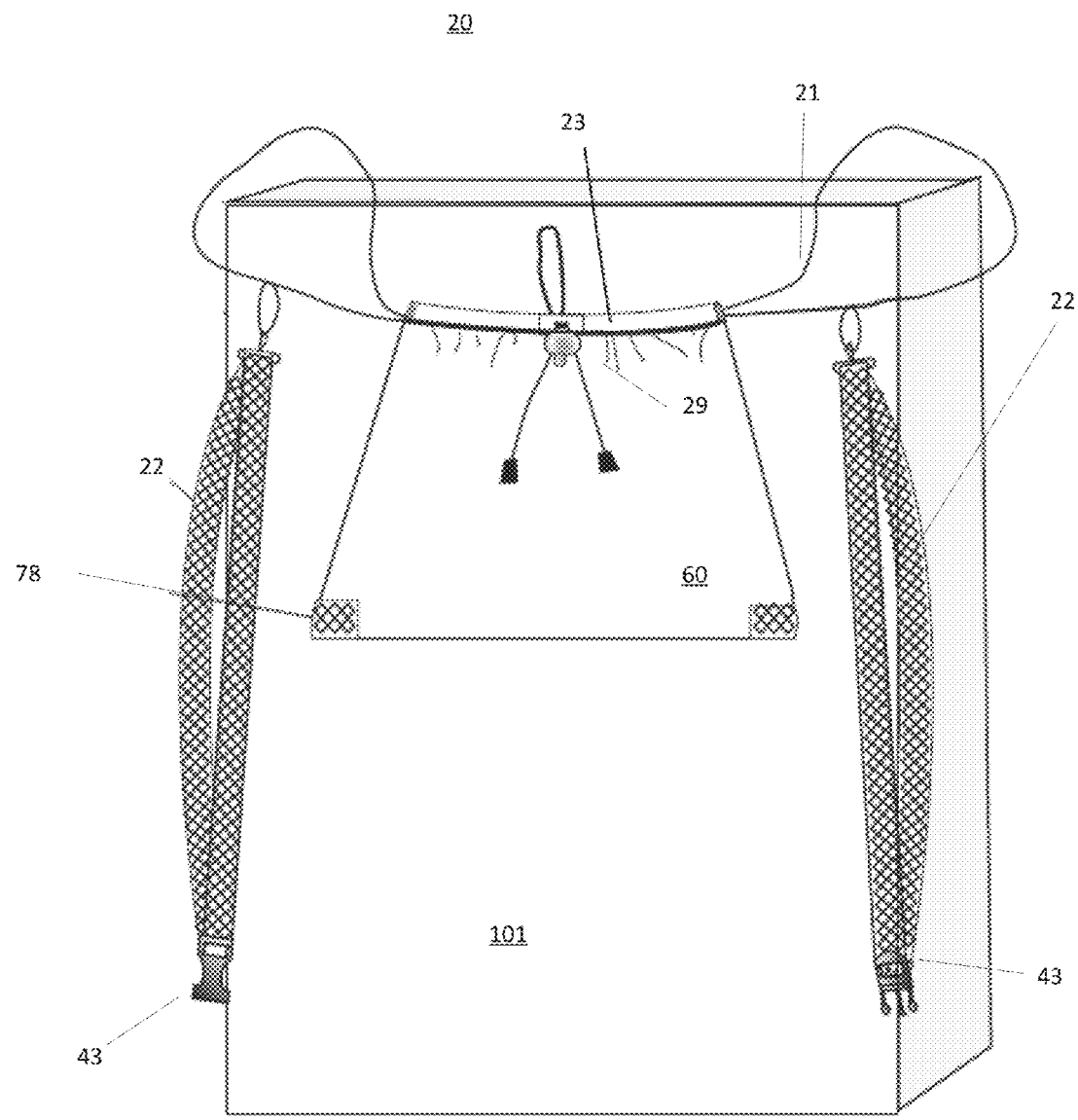
FIG. 6 is an exemplary illustration of a body support system storage pouch (or bag), according to an aspect of the invention.

FIG. 6 is an exemplary illustration of a body support system storage pouch (or bag) 60, according to an aspect of the invention. Pouch 60 may be sized and shaped to contain main body unit 30 of body support system 10. When main body unit 30 is placed inside pouch 60, attachment stay 21 may be tightened via cinching mechanism 29 to close pouch 60. In some implementations, suspension securing mechanisms 43 may then be attached, one to another, to permit lower stays 22 to form a carry handle for pouch 60. To facilitate such attachment, the left and right suspension securing mechanisms 43 may be complementary (e.g., male and female connectors). Thus, the entirety of body support system 10 may quickly and easily packaged for travel and provided with a convenient carry handle. Pouch 60 may be constructed of any suitable material, including cotton, wool, nylon, polyester, rayon, canvas, etc., and may match the material selected for main body unit 30. In some implementations, pouch 60 may be waterproof or water-resistant. In some implementations, pouch 60 may be constructed of a mesh material. In some implementations, pouch 60 may include additional loops 78. Additional loops 78 may be additional nylon webbing loops secured to pouch 60. Additional loops 78 may be secured to pouch 60 at lower portion, as shown, or at any other portion of the pouch 60. Additional loops 78 may permit lower stays 22 to be pass through to provide additional support to lower stays 22, acting as a handle, when body support system 10 is stored in pouch 60.

Exemplary Operation

Having provided a detailed description of the various components comprising body support system 10, an exemplary and non-limiting description of the operation of body support system 10 is now provided with reference to FIGS. 1-6.

In one implementation, a user of body support system 10 may sit in seat 100. When seated, the user may be wrapped or otherwise covered (either partially or completely) by main panel 40 (of main body unit 30) which may include upper body portion 31 and lower portion 32.

The user may attach seat stay loops 163 of left hood stay 51a and right hood stay 51b over the edges of the back of seat 100, place hood 58 over their head, and use cinching mechanism 165 to tighten both left hood stay 51a and right hood stay 51b. When tightened, hood stays (51a, 51b) may provide support for hood 58 and prevent the wearer's head, inside hood 58, from falling to the left, right, forward, or any combination thereof. Seat 100 prevents the wearer's head from falling backward. Thus, in the relaxation of sleep, the user's head can remain upright, and the user will not be disturbed by involuntary movement of his or her head. In some implementations, a user may extend one or both of seat stay loops 163 to loop over the back of seat 100 and loop around armrests or a seat belt of seat 100 to provide additional stability.

The user's legs may be supported by at least one lower stay 39 and suspension stays 22 as follows. The at least one lower stay 39 may include two lower stays 39, as illustrated in FIG. 1. The user may attach left side loop 25 and right side loop 26 of attachment stay 21 to the back of seat 101. Cinching mechanism 29 (illustrated in FIG. 4) may be used to tighten attachment stay 21 and secure suspension unit 20 to seat 101. Lower stay securing mechanisms 42 may be connected to suspension stay securing mechanisms 43 of suspension unit 20. The length of suspension stays 22 may be adjusted via adjusting mechanism 82 (illustrated in FIG. 5). The length of the lower stays 39 may be adjusted by altering a location of lower stay securing mechanisms 42.

As illustrated in FIG. 1, once connected to suspension stays 22, lower stays 39 are configured to support lower portion 32 of main body unit 30 and enable lower portion 32 to support and/or suspend the legs of the wearer. The adjustable nature of lower stays 39 and suspension stays 22 may permit the legs to be cradled at an adjustable height that provides the greatest comfort for the user. For example, lower stays 39 and suspension stays 22 may be adjusted to support the legs of a wearer at a height just above a floor and/or may be adjusted to raise the legs of a wearer such that the wearer's knees are level with or above the wearer's hips.

In addition to wrapping body portions with upper portion 31 and lower portion 32, a user may further employ left front panel 33 and right front panel 34 (illustrated in FIG. 2) to wrap across their torso, for example as a blanket to create warmth and to control temperature. Once secured by body support system 20, a user may still be free to secure themselves via seat-belt 103 for safety purposes.

Thus, body support system 20 may provide support to the body of a wearer when used in a seat. More particularly, body support system may provide support to at least the head and legs of a wearer. The head may be supported such that it does not fall forward or lean to the right or left, and the legs may be suspended for elevation. Such body support may assist a user in resting or sleeping in a seat. Body support system 20 may also be constructed so as to provide warmth and/or padding for a user.

Alternative Implementations

Figure 7A:
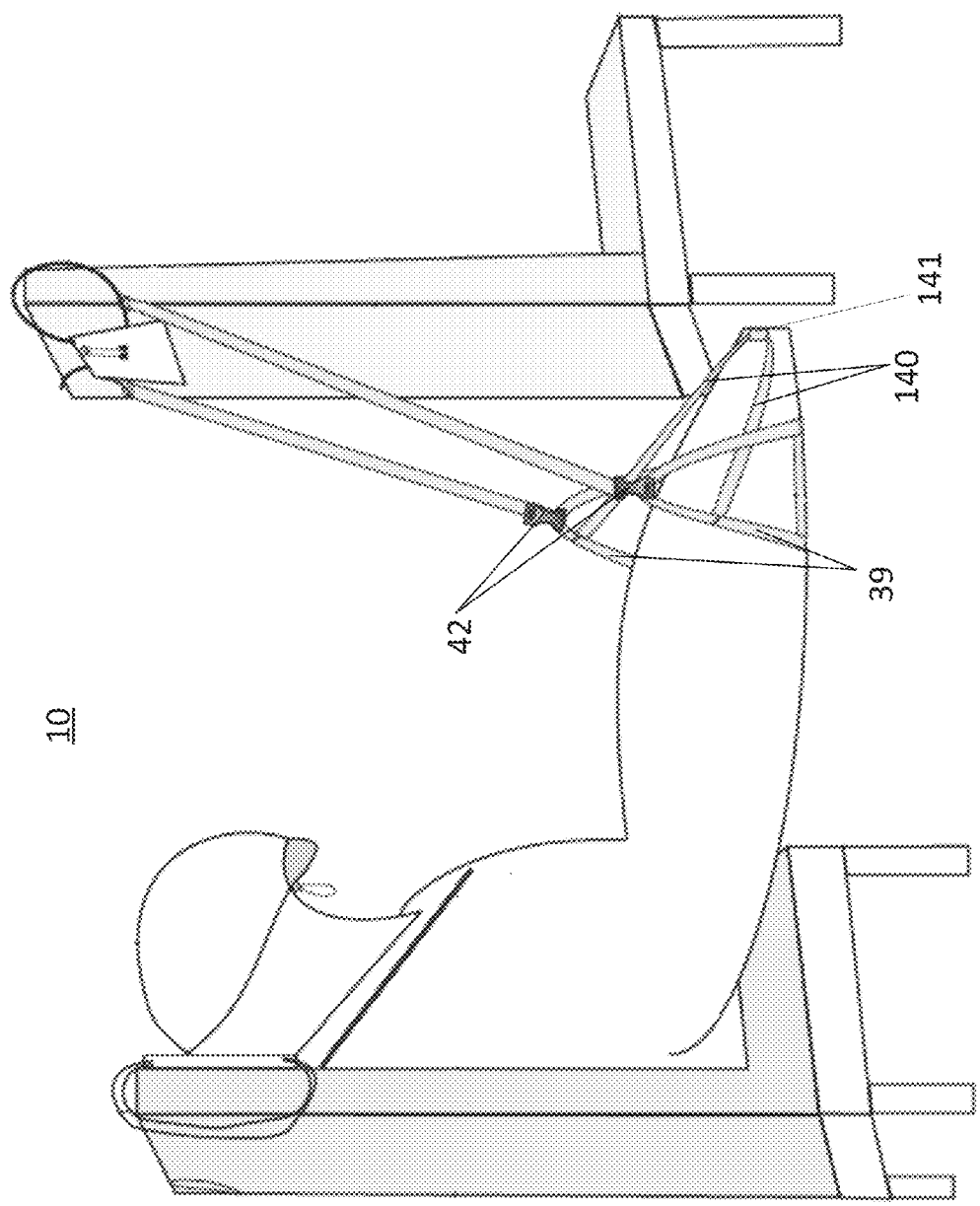
FIG. 7A is an exemplary illustration of a body support system for supporting at least a user's head and legs while in a seated position, according to an aspect of the invention.

FIGS. 7A and 7B illustrate an alternative implementation of body support system 10. FIG. 7A is an exemplary illustration of a body support system 10 for supporting at least a user's head and legs while in a seated position. As shown, lower stay support 140 may comprise a stay, including, for example, rope, string, line, cord, webbing, fabric strips, wire, metal strips, plastic strips, and/or any other material or structure. The ends of lower stay support 140 may connect to respective portions of lower stay 39. For example, a first end of lower stay support 140 may connect to a first (or upper, or left) portion of lower stay 39, while a second end of lower stay support 140 may connect to a second (or lower, or right) portion of lower stay 39.

Lower stay support 140 may be secured to lower portion 32 of body support system 10 by a lower stay support attachment loop 141. Lower stay support attachment loop 141 may secure the lower stay support 140 to the lower portion 32 at, for example, a toe end of lower portion 32. Lower stay support 140 may provide additional support to suspend the feet of a wearer when body support system 10 is in use. Lower stay support 140 may connect to lower stay 39 on either side of securing mechanism 42. FIG. 7B illustrates a front side of a body support system 10 (in a folded configuration) including lower stay support 140 and lower stay support attachment loop 141.

Figure 8:
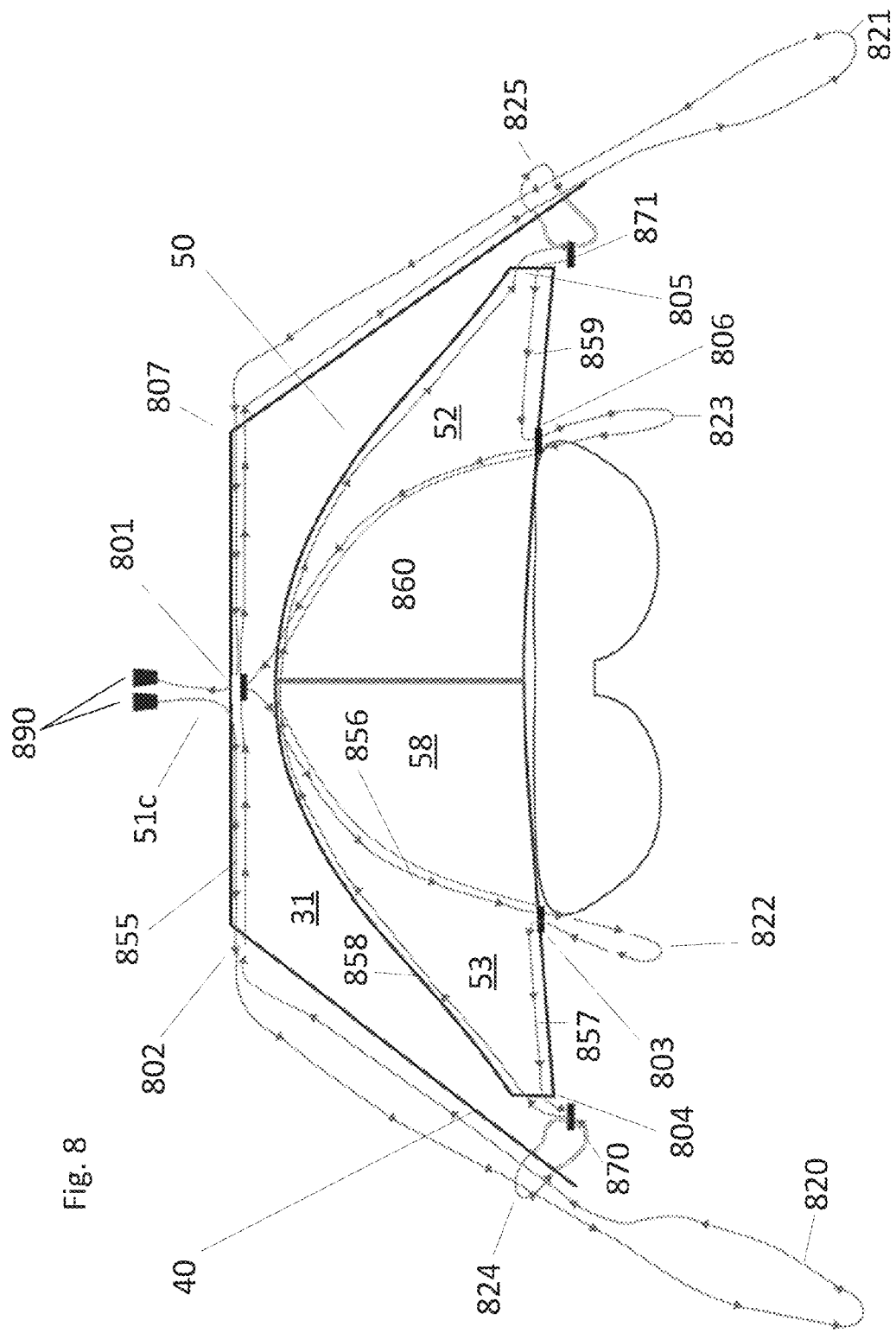
FIG. 8 is an exemplary illustration of a hood portion of a body support system, according to an aspect of the invention.

FIG. 8 is an exemplary illustration of an alternative implementation of hood portion 50 of body support system 10, according to an aspect of the invention. As depicted in FIG. 8, hood portion 50 may comprise hood 58 and a single hood stay 51c configured to secure hood 58 to seat 100 (not shown in FIG. 8). Hood portion 50 may also include multiple fabric channels, within which hood stay 51c may be situated. Hood stay 51c may secure hood 58 to seat 100 as follows.

Hood stay 51c may enter a fabric channel 855 running along a top of upper portion 31 of main panel 40 at central location 801, and exit fabric channel 855 at an end of upper portion 31 at location 802. A predetermined length of hood stay 51c may be formed into a first seat stay loop 820, and hood stay 51c may reenter fabric channel 855 at location 802.

At location 801, hood stay 51c may exit fabric channel 855 running along upper portion 31 and enter a fabric channel 856 running along a side of hood 58. Hood stay 51c may exit fabric channel 856 at location 803 to enter a fabric channel 857 at a base of right hood panel 53, forming first hood loop 822. Hood stay 51c may exit fabric channel 857 at location 804, pass through an eyelet 870 in upper portion 31 to a back side of body support system 10, form a first cord loop 824 around the portion of hood stay 51c forming first seat stay loop 820, then pass through eyelet 870 back to the front of body support system 10 to enter fabric channel 858 at location 804. Fabric channel 858 may run across a back of right hood panel 53 and left hood panel 52.

Hood stay 51c may follow a similar pattern on the left side of hood portion 50 as on the right side, as follows. Hood stay 51c may exit fabric channel 858 at an end of left hood panel 52 at location 805. Hood stay 51c may pass through an eyelet 871 to the back side of body support system 10 and form a second cord loop 825 around a portion of hood stay 51c forming second seat stay loop 821 before passing through eyelet 871 and entering fabric channel 859 at location 805. Hood stay 51c may exit fabric channel 859 at location 806, form second hood loop 823, and enter fabric channel 860 at location 806. Hood stay 51c may run through fabric channel 860 to location 801, exit fabric channel 860 and enter fabric channel 855. Hood stay 51c may exit fabric channel 855 at location 807 and form second seat stay loop 821 before reentering fabric channel 855 and running through to exit at location 801 near the opposite end of hood stay 51c. The ends of hood stay 51c may include hood stay ends 890. Hood stay ends 890 may be plastic (or other material) endpieces secured to either end of hood stay 51c to provide a secure gripping area for tightening hood stay 51c, and to prevent the ends of hood stay 51c from entering fabric channel 855.

Hood portion 58, as illustrated in FIG. 8, may be secured to a seat 100 (not shown in FIG. 8) by first and second seat stay loops 820, 821 of hood stay 51c. A user may use hood stay ends 890 to tighten seat stay loops 820 and 821 on the back of seat 100. When pulled tight via hood stay ends 890, hood stay 51c may also cause cord stay loops 824 and 825 to tighten around seat stay loops 820, 821 to provide further security. A wearer may use hood stay loops 822, 823 to tighten hood 58 around their head. In some implementations, a user may extend one or both of seat stay loops 820, 821 to loop over the back of seat 100 and loop around armrests or a seat belt of seat 100 to provide additional stability.

While examples and features of disclosed principles and apparatuses are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It is further to be understood that the invention contemplates that, to the extent possible, one or more features of any implementation can be combined with one or more features of any other implementation. Accordingly, various modifications and changes can be made without departing from the scope of the invention. It is intended that the scope of the invention should only be limited by the appended claims.

The invention claimed is:

1. A body support system for supporting at least a user's head and legs while the user is in a seated position in a user's seat, the body support system comprising:
   (i) a suspension unit configured for attachment to a structure or a first seat positioned forward of the user's seat, the suspension unit comprising:
      a suspension unit body portion including a storage pouch and at least one channel;
      at least one attachment stay comprising a first loop and a second loop that are each configured to attach to the structure or to the first seat, wherein a portion of the at least
   one attachment stay extends through the at least one channel of the suspension unit body portion;
      a first suspension stay attached to the first loop of the at least one attachment stay; and
      a second suspension stay attached to the second loop of the at least one attachment stay; and
   (ii) a main body unit, the main body unit comprising:
      a leg portion configured to wrap around the user's legs;
      a first stay secured to the leg portion;
      a second stay secured to the leg portion;
      a main body portion configured to wrap around the user's torso; and
      a hood portion including a hood configured to cover the user's head, and at least
   one hood stay configured to attach the hood portion to the user's seat;
   wherein the first suspension stay of the suspension unit is configured to attach to the first stay of the main body unit and the second suspension stay of the suspension unit is configured to attach to the second stay of the main body unit to elevate the leg portion of the main body unit and suspend it from the structure or the first seat; and
   wherein the storage pouch of the suspension unit body portion is configured to receive and store the main body unit when the body support system is not in use.

2. The body support system of claim 1, wherein the main body unit further comprises a pocket portion configured to receive a body support pillow.

3. The body support system of claim 1, wherein the hood portion further comprises:
   a first hood panel attached to a first side of the hood and to the main body portion; and
   a second hood panel attached to a second side of the hood and to the main body portion;
   wherein the at least one hood stay includes a first hood stay secured to the hood and to the first hood panel, and a second hood stay secured to the hood and to the second hood panel.

4. The body support system of claim 3, wherein the first hood stay and second hood stay are configured to exert opposing forces on the hood.

5. The body support system of claim 3, wherein the first hood stay and the second hood stay are configured to interlock.

6. The body support system of claim 3, wherein the first hood stay and the second hood stay each include a cinching mechanism.

7. The body support system of claim 1, wherein the hood portion further comprises:

an eye mask that is integral with, or releasably coupled to, the hood.

8. The bodysupport system of claim 1, wherein the first suspension stay of the suspension unit includes a length adjustment mechanism, and the second suspension stay of the suspension unit includes a length adjustment mechanism.

9. The body support system of claim 1, wherein the at least one attachment stay of the suspension unit further comprises a cinching mechanism.

10. The body support system of claim 1, wherein the main body portion of the main body unit further comprises a first front panel and a second front panel.

* * * * *